United States Patent
Dosaj et al.

(10) Patent No.: US 7,569,716 B2
(45) Date of Patent: Aug. 4, 2009

(54) METHOD OF SELECTING SILICON HAVING IMPROVED PERFORMANCE

(75) Inventors: Vishu Dutt Dosaj, Midland, MI (US); Michael George Kroupa, Midland, MI (US); Paul Jacques Marion, Florence, KY (US)

(73) Assignee: Dow Corning Corporation, Midland, MI (US)

( * ) Notice: Subject to any disclaimer, the term of this patent is extended or adjusted under 35 U.S.C. 154(b) by 353 days.

(21) Appl. No.: 10/590,749

(22) PCT Filed: Mar. 15, 2005

(86) PCT No.: PCT/US2005/008594

§ 371 (c)(1),
(2), (4) Date: Aug. 25, 2006

(87) PCT Pub. No.: WO2005/102926

PCT Pub. Date: Nov. 3, 2005

(65) Prior Publication Data

US 2008/0233035 A1 Sep. 25, 2008

Related U.S. Application Data

(60) Provisional application No. 60/560,532, filed on Apr. 8, 2004.

(51) Int. Cl.
  *C01B 33/02* (2006.01)
  *C01B 33/08* (2006.01)
  *C07F 7/00* (2006.01)
(52) U.S. Cl. .................. 556/473; 423/342; 423/348; 423/349; 556/472
(58) Field of Classification Search ............ 423/348, 423/342, 349; 556/472, 473
See application file for complete search history.

(56) References Cited

U.S. PATENT DOCUMENTS

| | | |
|---|---|---|
| 2,380,995 A | 8/1945 | Rochow |
| 2,380,996 A | 8/1945 | Rochow |
| 3,728,110 A | 4/1973 | Klar et al. |
| 4,247,528 A | 1/1981 | Dosaj et al. |
| 5,302,341 A | 4/1994 | Palowitz et al. |
| 5,427,952 A | 6/1995 | Daugherty et al. |
| 5,443,788 A | 8/1995 | Palowitz et al. |
| 5,973,177 A | 10/1999 | Kuivila et al. |

FOREIGN PATENT DOCUMENTS

| | | |
|---|---|---|
| DE | 3836940 | 5/1990 |
| ES | 2025981 | 4/1992 |
| ES | 2025982 | 4/1992 |
| ES | 2025980 | 4/1995 |
| RO | 103058 | 5/1992 |
| SU | 1636334 | 3/1991 |
| WO | WO 01/25496 | 4/2001 |

OTHER PUBLICATIONS

Clarke, Michael P.: "The Direct Synthesis of Methylchlorosilanes" Journal of Organometallic Chemistry, vol. 376, pp. 165-222, Nov. 7, 1989.

*Primary Examiner*—Jerry Lorengo
*Assistant Examiner*—Kevin M Johnson
(74) *Attorney, Agent, or Firm*—Matthew T. Fewkes

(57) ABSTRACT

Chemical grade silicon metalloid having improved performance in the direct process for making organohalosilanes is selected by (A) measuring the temperature of each batch of silicon metalloid during both the refining and the casting of the silicon metalloid; (B) measuring the elemental impurity levels in each batch of the silicon metalloid after refining of the silicon metalloid; (C) predicting the properties of the slag phase produced during refining of the silicon metalloid based on equilibrium calculations using the elemental impurity levels and the measured temperatures of each batch of silicon metalloid; and (D) selecting a chemical grade silicon metalloid for use in the direct process for making organohalosilanes based upon the predicted slag properties; such that the slag density, the viscosity, and the melting point of the slag, are within acceptable and predetermined ranges for each individual batch.

6 Claims, No Drawings

METHOD OF SELECTING SILICON HAVING IMPROVED PERFORMANCE

CROSS REFERENCE TO RELATED APPLICATIONS

This application is a U.S. national stage filing under 35 U.S.C. §371 of PCT Application No. PCT/US2005/008594 filed on 15 Mar. 2005, currently pending, which claims the benefit of U.S. Provisional Patent Application No. 60/560,532 filed 8 Apr. 2004 under 35 U.S.C. §119(e). PCT Application No. PCT/US2005/008594 and U.S. Provisional Patent Application No. 60/560,532 are hereby incorporated by reference.

FIELD OF THE INVENTION

The invention is directed to a method of selecting individual batches of silicon that are predictive of batches that would be easy to separate from slag, and therefore have low levels of detrimental oxide contamination. This results in improved silicon performance in the Rochow direct process. In particular, the method herein takes into account the interactions of refining temperature, casting temperature, aluminum levels, and calcium levels in silicon, in predicting the slag properties, as well as the ease of slag separation from silicon. This is an improvement on prior solutions that have either considered these factors independently, or relied on the measurement of oxide levels in representative samples of crushed lots.

BACKGROUND OF THE INVENTION

Organohalosilanes, particularly dialkyldichlorosilanes, are important intermediates in the silicone industry. The organohalosilanes are typically hydrolyzed and condensed to form polyorganosiloxanes that can then be processed to form, for example, silicone fluids, elastomers, sealants, adhesives, and resins. The predominant commercial process for preparing these organohalosilane intermediates is one commonly referred to as the "direct process" as originally described by Rochow in U.S. Pat. No. 2,380,995 (Aug. 7, 1945) and U.S. Pat. No. 2,380,996 (Aug. 7, 1945), which are incorporated herein by reference.

Because of the high volume of organohalosilanes used in the silicone industry, considerable effort has been devoted to optimizing the conversion of the silicon metalloid to the diorganodihalosilane, particularly to dimethyldichlorosilane. It is known in the silicone industry that different lots of chemical grade silicon metalloid react differently in the direct process. To attempt to control the variability of reactivity between lots of chemical grade silicon metalloid in the direct process, manufacturers of organohalosilanes have set strict controls on the acceptable types and levels of contaminants present in the silicon. For example, reference may be had to Volume 376 of the Journal of Organometallic Chemistry, by Michael P. Clarke, Pages 165-222, Nov. 7, 1989, entitled *The Direct Synthesis of Methylchlorosilanes*, which provides a comprehensive review of the direct process for synthesis of methylchlorosilanes and the effects of contaminants on the process.

U.S. Pat. No. 5,427,952 (Jun. 27, 1995) teaches a method for analyzing chemical grade silicon intended for use in the direct process for the presence of nonmetallic contaminants, including oxides and carbides of calcium, aluminum, and silicon. It is believed that a significant cause of the lot-to-lot variability of chemical grade silicon metalloid in the direct process is the presence of these nonmetallic contaminants. The method involves the separation of the contaminants by an alloying process and subsequent analysis of the contaminants for chemical composition.

U.S. Pat. No. 5,973,177 (Oct. 26, 1999), hereinafter the '177 patent, teaches a method for analyzing chemical grade silicon metalloid for oxide-impurities detrimental to the production of diorganodihalosilanes in the direct process by heating a sample under controlled conditions to a temperature greater than about 2300° C. in the presence of a carbon source such that a reduction product consisting of carbon monoxide and carbon dioxide which forms at above a temperature of about 1900° C. is predictive of chemical grade silicon metalloid performance in the direct process. In particular, the '177 patent teaches that the smaller the amount of reduction product formed above a temperature of about 1900° C., the greater is the specificity of the chemical grade silicon metalloid for the production yield of diorganodihalosilanes.

It has been found herein that the amount of detrimental oxide impurities present in chemical grade silicon metalloid can be predicted based on standard elemental analysis of the silicon metalloid and operating conditions of the refining process.

SUMMARY OF THE INVENTION

The invention relates to a method of selecting silicon metalloid having improved performance in the direct process for making organohalosilanes, in which an organohalide is reacted with silicon metalloid in the presence of a copper catalyst at an elevated temperature. The method is carried out by (A) measuring the temperature of each batch of silicon metalloid during both the refining and the casting of the silicon metalloid; (B) measuring the elemental impurity levels in each batch of the silicon metalloid after refining of the silicon metalloid; (C) predicting the properties of the slag phase produced during refining of the silicon metalloid based on equilibrium calculations using the elemental impurity levels and the measured temperatures of each batch of silicon metalloid; and (D) selecting a silicon metalloid for use in the direct process for making organohalosilanes based upon the predicted slag properties; such that the slag density, the viscosity, and the melting point of the slag are within acceptable and predetermined ranges for each individual batch.

In one method, (i) the predicted melting point of the slag is lower than the temperature during refining of the batch of silicon metalloid; (ii) the predicted slag density is at least 0.02 gram per $cm^3$ higher than the density of the batch of silicon metalloid at the casting temperature, alternatively at least 0.04 gram per $cm^3$ higher than the density of the batch of silicon metalloid at the casting temperature; (iii) the predicted slag viscosity is at least 35 poise at the casting temperature, alternatively at least 40 poise at the casting temperature, and alternatively at least 50 poise at the casting temperature.

These and other features of the invention will become apparent from a consideration of the detailed description.

DETAILED DESCRIPTION OF THE INVENTION

The method according to the present invention relates to the selection of chemical grade silicon metalloid having improved performance in the direct process for making organohalosilanes. It is generally carried out in four steps. In Step (A), the temperature of a batch of silicon metalloid is measured during both refining and casting. In Step (B), the elemental impurity levels in the batch of silicon metalloid is measured after refining. In Step (C), the properties of the slag phase are predicted based on equilibrium calculations using the elemental impurity levels and measured temperatures for the batch. In Step (D), a silicon metalloid for use in the direct process for making organohalosilanes is selected based upon the predicted slag properties such that the slag density, viscosity, and melting point of the slag are within acceptable and predetermined ranges for the individual batch.

As used herein, the phrase chemical grade silicon metalloid or chemical grade silicon for use in the direct process for making organohalosilanes, is intended to mean any silicon metalloid containing at least about 98 percent but less than 100 percent by weight of silicon metalloid and containing oxides of aluminum, calcium, and silicon as impurities.

The phrase direct process for making organohalosilanes as used herein is intended to mean a process wherein an organohalide is reacted with silicon metalloid in the presence of a copper catalyst at an elevated temperature (e.g., 200 to 700 C) to form a mixture containing various organohalosilanes.

The term slag as used herein, is intended to mean the oxides of aluminum, calcium, and silicon, which are typically separated from chemical grade silicon metalloid during its refining and casting, some of which may remain in the chemical grade silicon metalloid as impurities. The term detrimental oxide impurities as used herein, is intended to mean the oxides of aluminum and calcium which remain in the silicon metalloid as impurities.

The term silicon metalloid, as used herein, is synonymous with silicon or silicon metal. The term batches, as used herein, is intended to mean individual volumes of molten silicon refined in refining vessels such as refractory lined ladles. The term lots, as used herein, is intended to mean groups of batches that are crushed and packaged together. The sizes of lots vary depending on specific customer or supplier needs and shipping methods.

As noted, equilibrium calculations are used herein to predict the slag composition based on measured silicon impurity levels and temperatures. These calculations are based on equilibrium data which allows slag composition to be related to slag properties such as density, viscosity, and melting point. These calculations and equilibrium data are well known to those skilled in the art.

Chemical grade silicon metalloid is commonly selected based primarily on independent specification ranges for various impurity levels such as aluminum and calcium. However, it has been determined herein that these commonly used methods of selecting chemical grade silicon alone are insufficient for accurately predicting chemical grade silicon performance in the direct process. It has also been determined herein that interactions between aluminum levels, calcium levels, refining temperature, and casting temperature play strong roles in predicting chemical grade silicon performance in the direct process. In the present invention, these interactions are taken into account in the prediction of slag properties.

It is believed that the separation effectiveness of chemical grade silicon from slag is strongly influenced by the physical properties of the slag for each batch of refined chemical grade silicon. It should be understood, however, that it is very difficult to measure the physical properties of the slag directly. The method according to the present invention provides one skilled in the art with capability to estimate slag physical properties from easily obtainable measurements and, thereby, predict slag separation for each batch of refined chemical grade silicon. The slag properties of particular interest are viscosity, melting point, and density relative to the density of molten chemical grade silicon. The slag physical properties for each batch are predicted using equilibrium calculations.

As noted above, the method according to the invention generally includes four Steps (A), (B), (C), and (D). In Step (A), the refining and casting temperatures of each batch of chemical grade silicon are measured using methods typical in the industry, such as the use of expendable temperature sensors. In step (B), the elemental impurities in each batch of refined chemical grade silicon are measured. These include, for example, the levels of aluminum and calcium which are present. While the sampling method and the analytical method used for measuring the impurity levels is not a critical feature of the present invention, the sample analyzed should be representative of the batch of chemical grade silicon being considered. Accordingly, various sampling methods can be used such as expendable samplers or graphite cup samplers; and various analysis methods can be used such as X-ray fluorescence or plasma emission spectroscopy.

In step (C), the refining temperature, the casting temperature, and the chemical grade silicon elemental impurity levels (as measured in Steps (A) and (B)) are used to estimate the slag physical properties for each batch of chemical grade silicon. This estimation is accomplished for each batch using equilibrium calculations. The slag properties of particular interest are its melting point, viscosity, and density. In step (D), the predicted slag properties as determined in step (C) are used as the basis for selecting individual batches of chemical grade silicon for use in the direct process for making organohalosilanes, especially organohalosilanes such as dimethyldichlorosilane $(CH_3)_2SiCl_2$.

Thus, it has been unexpectedly discovered that the amount of detrimental oxide contaminants can be estimated based on the slag properties predicted for each chemical grade silicon batch, using equilibrium calculations. The estimated amount of detrimental oxide contaminants can then be used to predict the yield of chemical grade silicon for the production of diorganodihalosilanes in the direct process. It has also been unexpectedly discovered (i) that for optimum chemical grade silicon performance, the predicted melting point of the slag should be lower than the temperature during refining of the batch of chemical grade silicon; (ii) that the predicted slag density should be sufficiently different than the density of the batch of chemical grade silicon at the casting temperature; and (iii) that the predicted slag viscosity should be sufficiently large at the casting temperature. It is believed that these features (i) to (iii) are often necessary to allow for effective separation of the chemical grade silicon from the slag. Examples of this type of data include (i) the predicted melting point of the slag is lower than the temperature during refining of the batch of silicon metalloid; (ii) the predicted slag density is at least 0.02 gram per $cm^3$ higher than the density of the batch of silicon metalloid at the casting temperature, alternatively at least 0.04 gram per $cm^3$ higher than the density of the batch of silicon metalloid at the casting temperature; (iii) the predicted slag viscosity is at least 35 poise at the casting temperature, alternatively at least 40 poise at the casting temperature, and alternatively at least 50 poise at the casting temperature.

Thus, it is now possible to screen different shipments or lots of chemical grade silicon, and to choose and/or select those lots or shipments having more or less yield during diorganodihalosilane production as may be required by commercial demands. The method herein is especially suited for selecting chemical grade silicon for use in the direct process, where one of the preferred products is dimethyldichlorosilane.

The method can be used during production of silicon. In this regard, silicon is conventionally produced by the carbothermal reduction of quartz $(SiO_2)$ in an electric arc furnace.

The reducing agents are typically coal, charcoal, or coke, and the overall reduction reaction is represented by the equation: $SiO_2 + 2C \rightarrow Si + 2CO$. During its production, the silicon can be refined by tapping the molten silicon from the furnace into a refining vessel, typically a refractory lined ladle, and subsequently refining it in the ladle. Refining of the silicon is generally conducted on the liquid, i.e., molten silicon, by known oxidation or chlorination techniques. The detrimental oxide levels can be controlled by controlling the refining and casting temperatures and elemental impurity levels in each batch of refined silicon at levels that will result in a slag phase that is easy to separate from the silicon produced, namely that the slag properties, particularly melting point, viscosity, and density are within appropriate ranges. Refining and casting temperatures can be controlled by the addition of solidified silicon or adjusting refining gas flow rates and composition. The refining conditions, such as refining gas flow rates, composition, and refining time, can be adjusted to result in elemental impurity levels in each batch of refined silicon that are within the target ranges.

The following examples are set forth in order to illustrate the invention in more detail. These examples are not intended to limit the scope of the claims herein.

EXAMPLES

A number of lots of chemical grade silicon (CGS) were evaluated by the method according to the invention, and the results were correlated with the amount of detrimental oxide contaminants. For each batch of CGS within a specific lot, the slag properties at the time of production were predicted using the present method. The slag properties of each batch in a given lot were then used to calculate the percentage of silicon within acceptable ranges of slag properties for that lot. The slag properties that were evaluated were (i) the predicted slag melting point relative to the refining temperature for each chemical grade silicon batch, (ii) the predicted slag density relative to the chemical grade silicon density at the casting temperature for each batch of chemical grade silicon, and (iii) the predicted slag viscosity at the casting temperature for each batch of chemical grade silicon. The content of the detrimental oxide contaminants was measured for each lot according to the method described in the '177 patent, i.e., carrying out Steps A and B, which is considered incorporated herein by reference.

The results are summarized in the following Tables 1-4, and illustrate the correlation between the predicted slag properties of each batch of chemical grade silicon and the measured amount of the detrimental oxide contaminants. In particular, the results with respect to predicted slag melting point are summarized in Table 1, and illustrate the correlation between the predicted slag melting point and the amount of detrimental oxide contaminants in the chemical grade silicon.

TABLE 1

Correlation of Predicted Slag Melting Point With Detrimental Oxide Contaminants in Chemical Grade Silicon

| Lots | Percentage of silicon in lots outside of acceptable range. | Weight % Oxygen |
| --- | --- | --- |
| A1 | 0.2 | 0.088 |
| A2 | 15.1 | 0.111 |

The results with respect to the predicted slag density are summarized in Table 2, and illustrate the correlation between the predicted slag density and the amount of detrimental oxide contaminants in the silicon.

TABLE 2

Correlation of Predicted Slag Density With Detrimental Oxide Contaminants in Chemical Grade Silicon

| Lots | Percentage of Silicon in Lots Outside of Acceptable Range | Weight % Oxygen |
| --- | --- | --- |
| B1 | 0.0 | 0.113 |
| B2 | 2.5 | 0.139 |

The results with respect to the predicted viscosity are summarized in Table 3, and illustrate the correlation between the predicted slag viscosity and the amount of detrimental oxide contaminants in the silicon.

TABLE 3

Correlation of the Predicted Slag Viscosity With Detrimental Oxide Contaminants in Chemical Grade Silicon

| Lots | Percentage of Silicon in Lots Outside of Acceptable Range | Weight % Oxygen |
| --- | --- | --- |
| C1 | 19.9 | 0.1097 |
| C2 | 41.2 | 0.1416 |

The results with respect to the combined impact of slag melting point, slag density, and the slag viscosity are summarized in Table 4, and illustrate the correlation between the predicted slag properties and the amount of detrimental oxide contaminants in the silicon.

TABLE 4

Correlation of Predicted Slag Melting Point, Density, and Viscosity With Detrimental Oxide Contaminants in Chemical Grade Silicon

| Lots | Percentage of Silicon in Lots Outside of Acceptable Range for Slag Melting Point | Percentage of Silicon in Lots Outside of Acceptable Range for Slag Density | Percentage of Silicon in Lots Outside of Acceptable Range for Slag Viscosity | Weight % Oxygen |
| --- | --- | --- | --- | --- |
| D1 | 0.3 | 0.0 | 3.7 | 0.080 |
| D2 | 3.4 | 6.7 | 37.4 | 0.153 |

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of selecting chemical grade silicon metalloid having improved yield in the direct process for making organohalosilanes, in which an organohalide is reacted with silicon metalloid in the presence of a copper catalyst at an elevated temperature, the method comprising:

(A) measuring the temperature of a batch of silicon metalloid during both the refining and the casting of the silicon metalloid; (B) measuring the elemental impurity levels in the batch of the silicon metalloid; (C) predicting the properties of slag produced during refining of the silicon metalloid based on equilibrium calculations using the elemental impurity levels and the measured temperatures of the batch of silicon metalloid; and (D) selecting a chemical grade silicon metalloid for use in the direct process for making organohalosilanes such that the predicted slag density is at least 0.02 gram per cm³ higher than the density of the batch of chemical grade silicon at the casting temperature, the predicted slag viscosity is at least 35 poise at the casting temperature, and the predicted melting point of the slag is lower than the temperature during refining of the batch of chemical grade silicon and using the selected chemical grade silicon metalloid in the direct process for making organohalosilanes.

2. A method according to claim 1 in which the organohalosilanes include dimethyldichlorosilane and the chemical grade silicon metalloid is selected to favor the production yield of dimethyldichlorosilane.

3. A method according to claim 1 in which the predicted slag density is at least 0.04 gram per cm³ higher than the density of the batch of chemical grade silicon at the casting temperature.

4. A method according to claim 1 in which the predicted slag viscosity is at least 40 poise at the casting temperature.

5. A method according to claim 1 in which the predicted slag viscosity is at least 50 poise at the casting temperature.

6. A method of production of silicon, in which quartz ($SiO_2$) is carbothermally reduced in an electric arc furnace, refined, and cast, the method comprising (A) controlling the temperature of silicon during both the refining and the casting of the silicon;

(B) controlling the elemental impurity levels in the silicon after refining of the silicon;

(C) predicting the properties of slag produced during refining of the silicon based on equilibrium calculations, using the elemental impurity levels and the measured temperature of the silicon; and (D) selecting the silicon for use in a direct process such that the predicted slag density is at least 0.02 gram per cm³ higher than the density of the batch of chemical grade silicon at the casting temperature, the predicted slag viscosity is at least 35 poise at the casting temperature, and the predicted melting point of the slag is lower than the temperature during refining of the batch of chemical grade silicon.

\* \* \* \* \*